US012604065B2

(12) United States Patent
Hedinsson et al.

(10) Patent No.: US 12,604,065 B2
(45) Date of Patent: Apr. 14, 2026

(54) SYSTEMS AND METHODS FOR BROADCASTING DATA CONTENTS RELATED TO MEDIA CONTENTS USING A MEDIA DEVICE

(71) Applicant: Disney Enterprises, Inc., Burbank, CA (US)

(72) Inventors: Skarphedinn Hedinsson, Encino, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 377 days.

(21) Appl. No.: 15/153,347

(22) Filed: May 12, 2016

(65) Prior Publication Data

US 2017/0332147 A1 Nov. 16, 2017

(51) Int. Cl.

| | |
|---|---|
| *H04N 21/488* | (2011.01) |
| *H04N 21/41* | (2011.01) |
| *H04N 21/43* | (2011.01) |
| *H04N 21/434* | (2011.01) |
| *H04N 21/4363* | (2011.01) |
| *H04N 21/438* | (2011.01) |
| *H04N 21/472* | (2011.01) |
| *H04N 21/4722* | (2011.01) |
| *H04N 21/6543* | (2011.01) |
| *H04N 21/81* | (2011.01) |
| *H04N 21/858* | (2011.01) |

(52) U.S. Cl.
CPC ... *H04N 21/4882* (2013.01); *H04N 21/41265* (2020.08); *H04N 21/4131* (2013.01); *H04N 21/43079* (2020.08); *H04N 21/4348* (2013.01); *H04N 21/43637* (2013.01); *H04N 21/438* (2013.01); *H04N 21/472* (2013.01); *H04N 21/4722* (2013.01); *H04N 21/6543* (2013.01); *H04N 21/8133* (2013.01); *H04N 21/858* (2013.01)

(58) Field of Classification Search
CPC ......... H04N 21/42207; H04N 21/4882; H04N 21/41265; H04N 21/4131; H04N 21/4348; H04N 21/472
See application file for complete search history.

(56) References Cited

U.S. PATENT DOCUMENTS

| | | | | |
|---|---|---|---|---|
| 5,191,615 A | * | 3/1993 | Aldava | A63H 3/28 |
| | | | | 348/485 |
| 9,259,651 B1 | * | 2/2016 | Yano | A63H 3/36 |

(Continued)

OTHER PUBLICATIONS

"ATSC Recommended Practice: Implementation Guidelines for the ATSC Data Broadcast Standard (Doc. A/90)" Advanced Television Systems Committee, Jun. 10, 2001, pp. 1-122.

*Primary Examiner* — Joshua D Taylor
(74) *Attorney, Agent, or Firm* — Farjami & Farjami LLP

(57) ABSTRACT

There is provided a system including a display, a wireless communication element, a non-transitory memory storing an executable code, and a hardware processor executing the executable code to receive an input signal including a media content and a data content associated with the media content, extract the data content from the input signal, display the media content on the display, and transmit the data content of the input signal to a user device using the wireless communication element.

14 Claims, 6 Drawing Sheets

100

(56)  References Cited

U.S. PATENT DOCUMENTS

| | | | |
|---|---|---|---|
| 2008/0010584 A1* | 1/2008 | Corsetti | G06Q 30/02 |
| | | | 715/201 |
| 2009/0002181 A1* | 1/2009 | Gayden | G08B 7/06 |
| | | | 340/601 |
| 2009/0175536 A1* | 7/2009 | Gutta | H04N 9/73 |
| | | | 382/166 |
| 2010/0063878 A1* | 3/2010 | Bachet | H04N 21/84 |
| | | | 707/769 |
| 2011/0124264 A1* | 5/2011 | Garbos | A63H 3/28 |
| | | | 446/147 |
| 2012/0233646 A1* | 9/2012 | Coniglio | H04N 21/8586 |
| | | | 725/78 |
| 2013/0130587 A1* | 5/2013 | Cohen | A63H 30/04 |
| | | | 446/175 |
| 2016/0179746 A1* | 6/2016 | Hein | G06F 1/12 |
| | | | 710/105 |
| 2016/0184726 A1* | 6/2016 | Andersson | A63H 30/04 |
| | | | 710/8 |
| 2016/0243453 A1* | 8/2016 | Yano | A63F 13/40 |
| 2016/0349813 A1* | 12/2016 | DiSessa | G06F 1/28 |

* cited by examiner

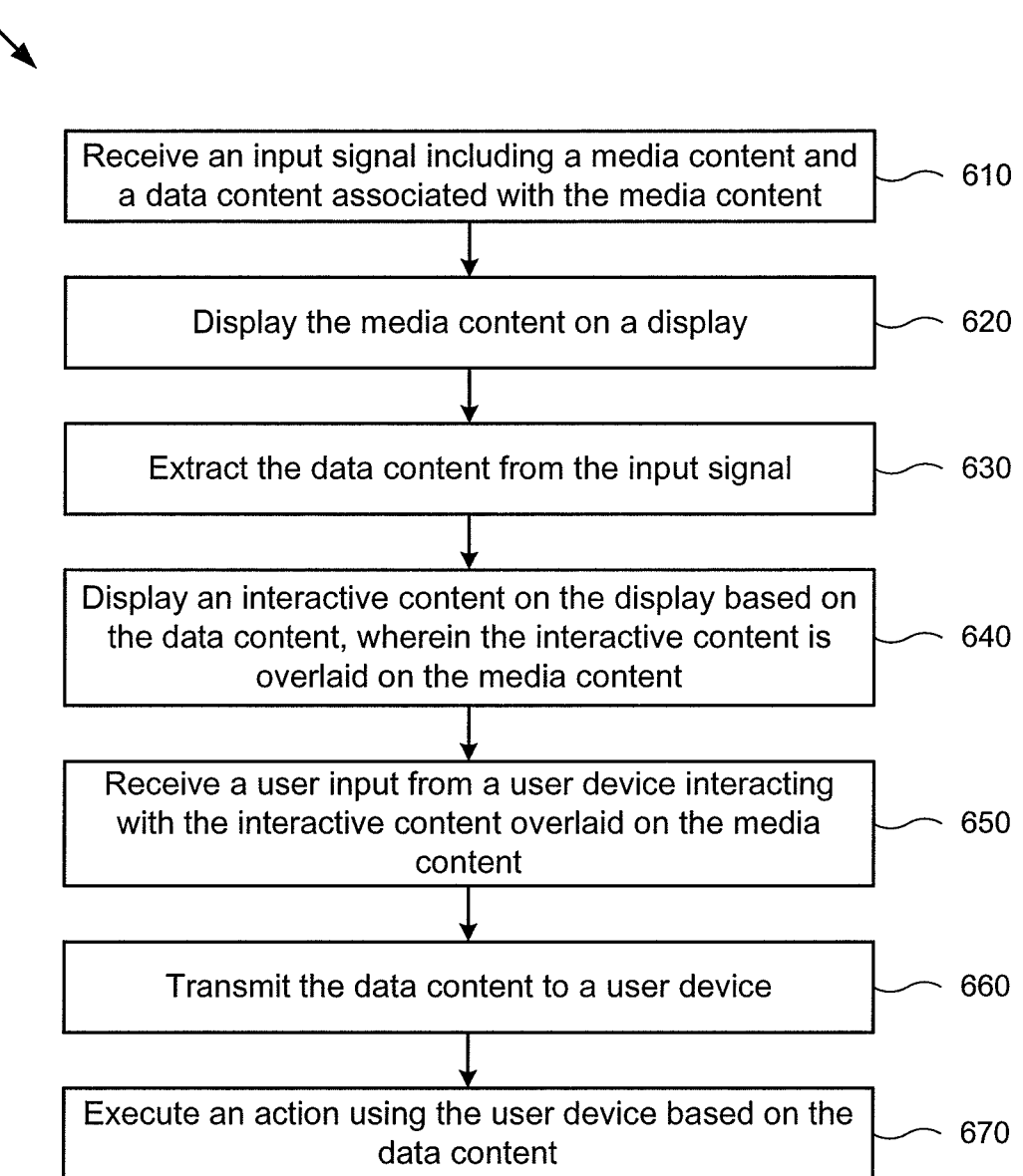

600

| Receive an input signal including a media content and a data content associated with the media content | 610 |

↓

| Display the media content on a display | 620 |

↓

| Extract the data content from the input signal | 630 |

↓

| Display an interactive content on the display based on the data content, wherein the interactive content is overlaid on the media content | 640 |

↓

| Receive a user input from a user device interacting with the interactive content overlaid on the media content | 650 |

↓

| Transmit the data content to a user device | 660 |

↓

| Execute an action using the user device based on the data content | 670 |

FIG. 6

SYSTEMS AND METHODS FOR BROADCASTING DATA CONTENTS RELATED TO MEDIA CONTENTS USING A MEDIA DEVICE

BACKGROUND

Conventional consumer media devices, such as televisions, receive media contents broadcast by content providers, and display the media contents on a display for viewers. Such media contents include television programs, news broadcasts, movies, etc. Increasingly, however, consumers receive media contents over a packet network, such as the Internet. Some consumer media devices, such as tablet computers, receive media contents using home wireless networks. Yet, consumer media devices do not fully realize their utility when limited to receiving television programs, news broadcasts, movies, etc.

SUMMARY

The present disclosure is directed to systems and methods for broadcasting data contents related to media contents using a media device, substantially as shown in and/or described in connection with at least one of the figures, as set forth more completely in the claims.

BRIEF DESCRIPTION OF THE DRAWINGS

FIG. 6 shows a flowchart illustrating an exemplary method of broadcasting data contents related to media contents using a media device, according to one implementation of the present disclosure.

DETAILED DESCRIPTION

Figure 1:
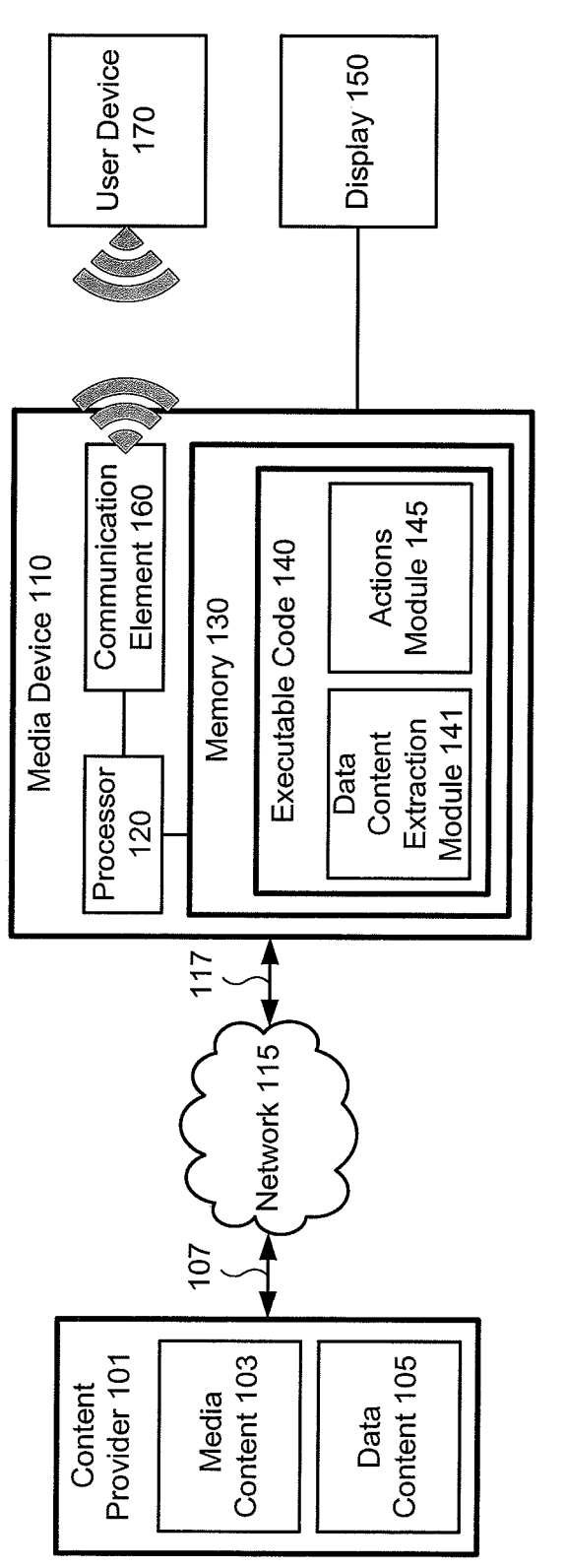
FIG. 1 shows a diagram of an exemplary system for broadcasting data contents related to media contents using a media device vice, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for broadcasting data contents related to media contents using a media device, according to one implementation of the present disclosure. System 100 includes content provider 101 in communication with media device 110 via network 115, and user device 170. Content provider 101 may be a media production company, such as a television network, an Internet TV network, a movie studio, etc. In some implementations, content provider 101 may be a media aggregation and/or distribution company, such as Netflix, Hulu, Amazon Video, etc. Content provider 101 is connected to network 115 via connection 107, which is in turn connected to media device 110 via connection 117. Network 115 may be a computer network, such as the Internet. Content provider 101 may transmit media content 103 and data content 105 to media device 110 over network 115.

Media content 103 may be a program recorded for delayed broadcast, such as a sitcom, a cartoon, a movie, or media content 103 may be a program for live broadcast, such as a news broadcast or a sporting event, etc. Data content 105 may be information related to media content 103 and may be transmitted with media content 103. In some implementations, data content 105 may be transmitted using a dedicated data stream that is transmitted with media content 103. Data content 105 may include information related to media content 103, such as a website or uniform resource locator (URL). In other implementations, data content 105 may include instructions for execution by user device 170. Data content 105 may be synchronized with media content 103, such that instructions executed by a user device may result in the user device acting in a way to augment media content 103. For example, media content 103 may be a movie, and data content 105 may include instructions for a wirelessly connected lighting system to reduce the intensity of the light in a room where a user is watching media content 103 when the movie transitions to a scene that takes place at night, thereby augmenting the user experience of the movie. Alternatively, data content 105 may augment the user experience of media content by providing an interactive content overlaid on media content 103, such as a website related to media content 103.

Media device 110 may be a media device for displaying media content 103 and executing an action based on data content 105. In some implementations, media device 110 may be a smart television, a set top box, a digital media player, such as Apple TV, Roku, Sony Google TV, a computer, a tablet computer, etc. Media device 110 includes processor 120, memory 130, display 150, and communication element 160. Processor 120 is a hardware processor, such as a central processing unit (CPU) used in computing devices. Memory 130 is a non-transitory storage device for storing computer code for execution by processor 120, and storing various data and parameters. Memory 130 includes executable code 140.

Executable code 140 includes one or more software modules stored in memory 130 for execution by processor 120 of media device 110. As shown in FIG. 1, executable code 140 includes data content extraction module 141 and actions module 145. Data content extraction module 141 is a software module stored in memory 130 for execution by processor 120 to extract data content 105 from the input signal received by media device 110 from content provider 101. In some implementations, data content extraction module 141 may extract data content 105 from the input signal for execution by media device 110 and/or transmission to user device 170.

Actions module 145 is a software module stored in memory 130 for execution by processor 120. Actions module 145 may execute one or more actions in data content 105 extracted from the input signal. For example, actions module 145 may provide an interactive overlay displayed on display 150, the interactive overlay appearing on top of media content 103 and allowing the user to interact with the data content displayed in the overlay. The overlay may include interactive content such as a website related to media content 103. In other implementations, actions module 145 may play an audio, display a message, or otherwise act to notify a user of the occurrence of some trigger event. The trigger event may be a pre-programmed event, such as when playback of media content 103 reaches a certain point, or the trigger event may be an unplanned event, such as a breaking news event.

Display 150 is a display for displaying media content 103. In some implementations, display 150 may be part of media device 110, such as the display of a notebook computer, the display of a tablet computer, the display of a smart television, etc. In other implementations, display 150 may be a display connected to media device 110, such as a television connected to a set top box.

Communication element 160 may be a communication port for connecting media device 110 to one or more other devices, such as user device 170. In some implementations, communication element 160 may be configured to receive a communication cable, such as a universal serial bus (USB) cable, Firewire cable, Ethernet cable, telephone cable, HDMI cable, video game control cable, etc. In other implementations, communication element 160 may enable wireless communications, such that media device 110 may be wirelessly connected to various other devices, such as user device 170, using WiFi, cellular, Bluetooth®, Bluetooth® Low Energy (BLE), etc.

User device 170 may be a wireless enabled device that may connect directly to media device 110, or may connect to media device 110 through a computer network, such as a local area network or the Internet. User device 170 may receive data contents from data content extraction module 141 including an executable command, such as a command to play an audio, display a website, adjust a light setting, etc. In some implementations, user device 170 may be a mobile device, such as a tablet computer, a mobile phone, etc., and may be used to execute a command based on data content 105 and/or provide input to media device 110 based on data content 105.

In other implementations, user device 170 may be a wireless enabled device, such as a home appliance. For example, user device 170 may include a wireless connected lighting system, such as an in-home lighting system or an ambient light system for use with display 150. User device 170 may be used to provide ambient light surrounding display 150 based on data content 105, ambient light in the room where the user is using media device 110 based on data content 105, or user device 170 may be used to communicate with the user, such as when user device 170 is used as an alert and the lights of the lighting system flash to provide an indication or warning based on data content 105. User device 170 may include an audio system and may be used to provide audio communication to the user based on data content 105.

Figure 2:
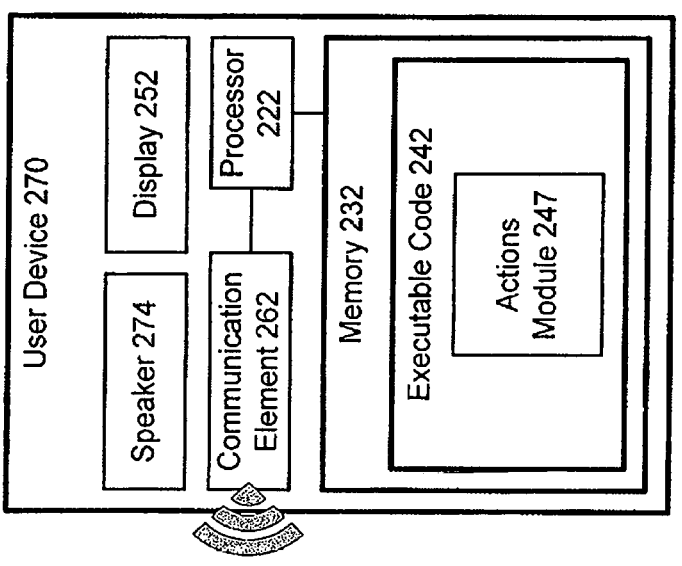
FIG. 2 shows a diagram of an exemplary user device for use with the system of FIG. 1, according to one implementation of the present disclosure.
Figure 2:
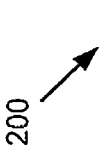
Figure 2:

FIG. 2 shows a diagram of an exemplary user device for use with the system of FIG. 1, according to one implementation of the present disclosure. System 200 includes media device 210 and user device 270. Media device 210 corresponds to media device 110. User device 270 includes processor 222, memory 232, display 252, communication element 262, and speaker 274. Processor 222 is a hardware processor, such as a CPU used in computing devices. Memory 232 is a non-transitory storage device for storing computer code for execution by processor 222, and storing various data and parameters. Memory 232 includes executable code 242.

Executable code 242 includes one or more software modules stored in memory 232 for execution by processor 222 of user device 270. As shown in FIG. 2, executable code 242 includes actions module 247. Actions module 247 is a software module stored in memory 232 for execution by processor 222 of user device 270. Actions module 247 may execute one or more actions in data content 105 extracted from the input signal. For example, actions module 247 may play an audio using speaker 274, display a message on display 252, or otherwise act to notify a user of the occurrence of some trigger event. The trigger event may be a pre-programmed event, such as when playback of media content 103 reaches a certain point, or the trigger event may be an unplanned event, such as a breaking news event.

Communication Element 262 is for communicatively connecting user device 270 to one or more other devices, such as media device 110. In some implementations, communication element 262 may be configured to receive a communication cable such as a universal serial bus (USB) port, Firewire port, Ethernet cable port, telephone cable port, HDMI port, video game control port, etc. In other implementations, communication element 262 may enable wireless communications, such that user device 270 may be wirelessly connected to media device 110, using WiFi, cellular, Bluetooth®, Bluetooth® Low Energy (BLE), etc.

Figure 3:
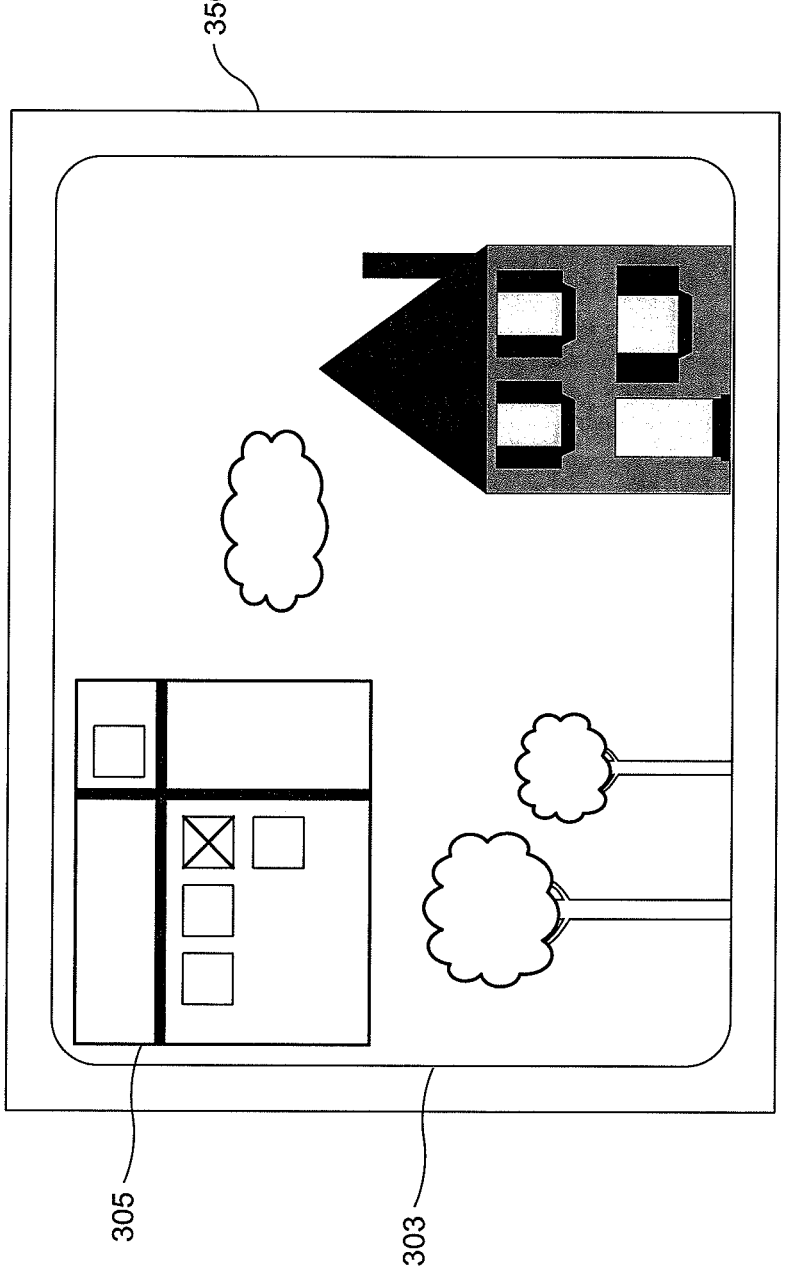
FIG. 3 shows a diagram of an exemplary media device showing a media content with a data content, according to one implementation of the present disclosure.

FIG. 3 shows a diagram of an exemplary media device showing a media content with a data content, according to one implementation of the present disclosure. Diagram 300 shows display 350 displaying media content 303 and data content 305. Data content 305 may be an interactive overlay displayed on display 350. For example, media content 303 may be a news report, and data content 305 may include a website providing information related to the location of a breaking news story, or media content 303 may be a movie and data content 305 may include a URL of an e-commerce website related to the movie. In some implementations, data content 305 may be displayed as a pop-up window, a picture-in-picture window, etc. The user may interact with data content 305, for example, by navigating the website displayed in the interactive overlay on display 350.

Figure 4:
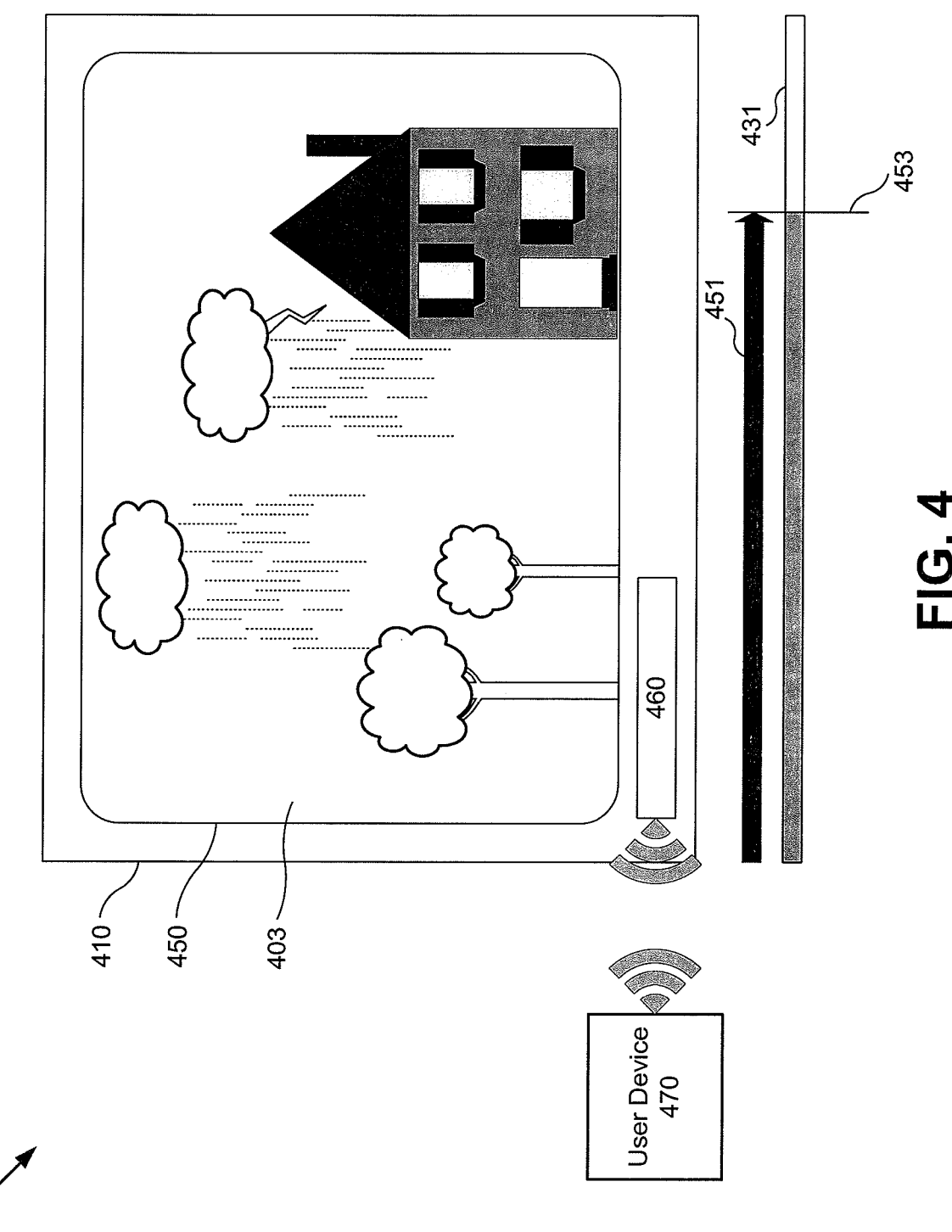
FIG. 4 shows a diagram of an exemplary media device displaying the media content and transmitting the data content to a user device, according to one implementation of the present disclosure.

FIG. 4 shows a diagram of an exemplary media device displaying the media content and transmitting the data content to a user device, according to one implementation of the present disclosure. Diagram 400 shows display 450 displaying media content 403, and includes communication element 460, user device 470, progress indicator 451, media timeline 431, and trigger event 453. User device 470 may be used to communicate a warning or a message. Trigger event 453 may be a weather alert, such as an extreme weather watch, and media device 410 may transmit data content 105 to user device 470. User device 470 may alert the user by playing an audio, flashing one or more lights, etc. In some implementations, user device 470 may act in a way to prevent damage to user device 470, such as powering down during a lightning storm to avoid damage to electrical components resulting from a power surge, etc.

Figure 5:
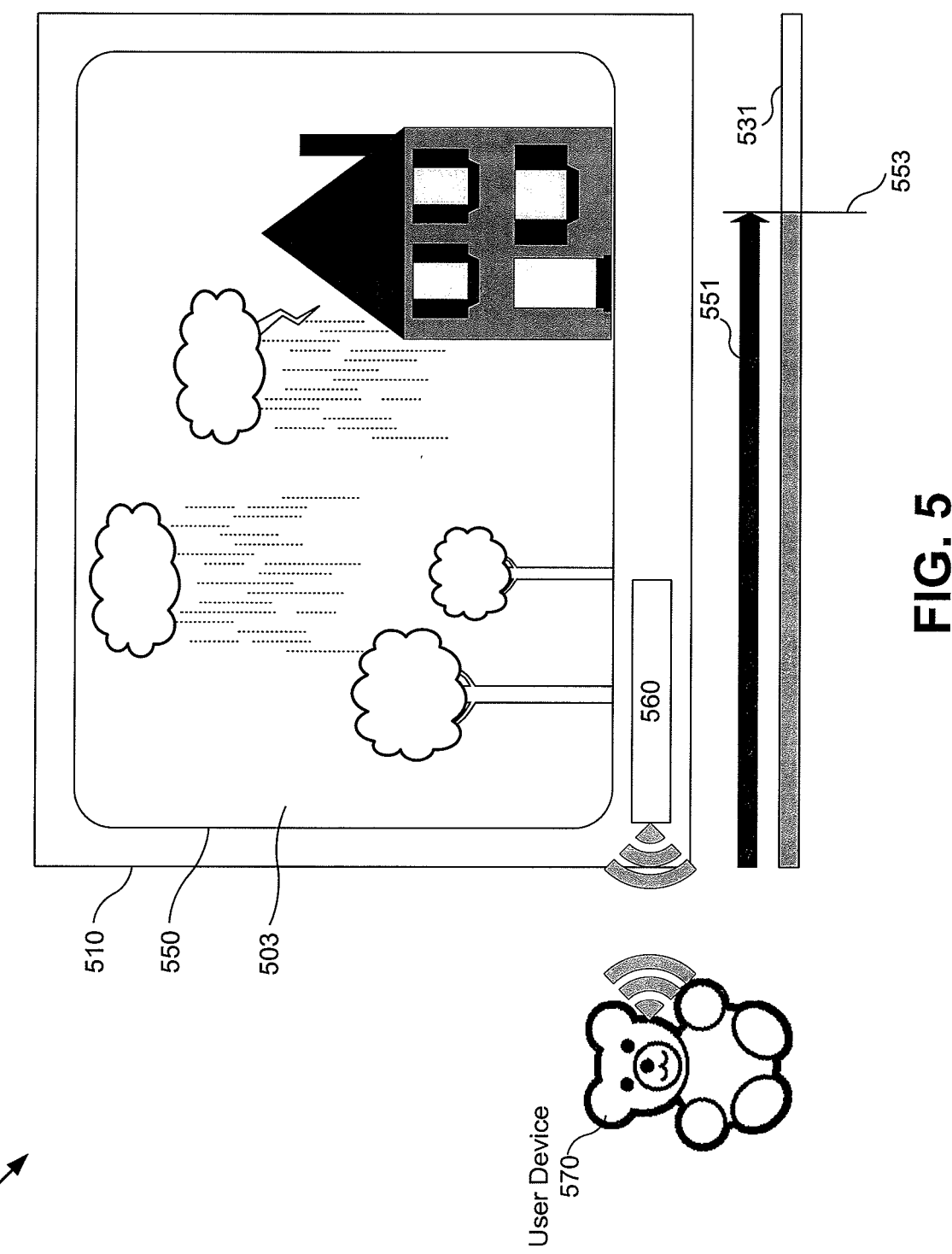
FIG. 5 shows a diagram of an exemplary media device displaying the media content and transmitting the data content to a user device, according to one implementation of the present disclosure.

FIG. 5 shows a diagram of an exemplary media device displaying the media content and transmitting the data content to a user device, according to one implementation of the present disclosure. Diagram 500 shows display 550 displaying media content 503, and includes communication element 560, user device 570, progress indicator 551, media timeline 531, and trigger event 553. In some implementations, user device 570 may be a toy related to media content 503, such as a plush toy of a character in an animated movie. When playback of media content 503 reaches trigger point 553, media device 510 may transmit data content 105 to user device 570. In response to receiving data content 105, user device 570 may execute an action, such as playing an audio pronouncing a catch phrase of the character at trigger point 453. In some implementations, data content 105 may include instructions programming user device 570 to listen for keywords in the audio played by media device 510. User device 570 may play an audio related to media content 503 in response to detecting the keyword in the audio played by media device 510.

FIG. 6 shows a flowchart illustrating an exemplary method of broadcasting data contents related to media contents using a media device, according to one implementation of the present disclosure. Method 600 begins at 610, where executable code 140 receives an input signal including media content 103 and data content 105 associated with media content 103. Media content 103 may include a television program, a live media content, a movie, etc. Television programs may include media content created or recorded for delayed broadcast, such as a sitcom, a comedy show, a cartoon or other animated media content, etc. The input signal may be a broadcast signal, such as an over-the-air television broadcast signal, a digital signal, such as a cable television broadcast signal or a broadband signal, a streaming signal, such as an MPEG transport stream, etc. Data content 105 may be included in a dedicated data channel or a dedicated data stream of the input signal, as metadata, etc.

At 620, executable code 140 displays media content 103 on display 150. Media content 103 may be a television show, a movie, or other media content. Method 600 continues at 630, where executable code 140 extracts data content 105 from the input signal. In some implementations, data content 105 may include one or more instructions to be executed by processor 120 of media device 110. For example, data content may include an instruction to display an interactive content, e.g., a website, on display 150. In other implementations, data content 105 may include one or more instructions to be executed by processor 222 of user device 270.

At 640, executable code 140 displays an interactive content on display 150 based on data content 105, wherein the interactive content is overlaid on media content 103. Display 150 may show the interactive content in a window that appears over media content 103, such as a picture-in-picture window. In some implementations, data content 105 may include a domain name and/or URL for a website that is related to media content 103. For example, media content 103 may be a movie and data content 105 may include a website related to the movie on display 150. The website may be a content creator's website or a social media website related to the movie. In other implementations, media content 103 may be a news broadcast and data content 105 may include a website related to one or more of the news stories. For example, the news broadcast may include a story about one or more individuals. Data content 105 may include a website with supplemental information about the news story and/or one or more of the individuals involved in the news story.

At 650, executable code 140 receives a user input from an input device (not shown) interacting with the interactive content overlaid on media content 103. In some implementations, the input device may include a remote control for media device 110, a mobile device, a keyboard, a mouse, etc. In some implementations, interacting with the interactive content may include navigating the website or a plurality of websites on the Internet.

At 660, executable code 140 transmits data content 105 to user device 170. In some implementations, media device 110 may wirelessly transmit data content 105 using communication element 160 to user device 170. User device 170 may be a toy, an audio system, a lighting system, or other wirelessly connected device or appliance. Data content 170 may include executable code for execution by processor 222 of user device 170. Method 600 continues at 670, where user device 170 executes an action based on data content 105. In some implementations, user device 170 may be a lighting system in a room or house of a user, and user device 170 may adjust the brightness of the lights to augment the setting or mood in media content 103. For example, the brightness of the lights may be reduced when a scene in media content 103 takes place at night, thus allowing the user to experience the feeling of night in a more dimly lit room. In other implementations, the lights may be used to signal an event to the user, such as by flashing the lights to indicate a breaking news event. User device 170 may be a stereo system or other appliance in the home of the user.

User device 170 may be a toy, such as an action figure, a stuffed animal, a plush toy, or other toy representing a character from media content 103. In such an implementation, user device 170 may move and/or play an audio based on data content 105. For example, user device 170 may play an audio including lines the character speaks in media content 103 in synch with media content 103. The synchronized action of user device 170 may augment media content 103.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:

a media device including a wireless communication element;

a display;

a room lighting system wirelessly connected to the media device, the room lighting system configured to provide room lighting and execute an action, the room lighting system being separate and distinct from the display;

a non-transitory memory of the media device storing an executable code; and a hardware processor of the media device configured to execute the executable code to:

receive a media transmission signal including video content and data content associated with the video content, the data content associated with the video signal and included in the media transmission signal being in a dedicated data stream of the media transmission signal;

extract the data content associated with the video content from the received media transmission signal;

display the video content on the display in accordance with a video content timeline; and transmit from the media device to the room lighting system, using the wireless communication element, the data content, wherein transmission of the data content occurs in response to reaching a pre-programmed trigger event in the video content timeline while displaying the video content on the display;

wherein instructions included in the data content cause the room lighting system to execute the action to change an intensity of the room lighting provided by the room lighting system.

2. The system of claim 1, wherein the data content included in the media transmission signal is synchronized with the video content included in the media transmission signal.

3. The system of claim 1, wherein the trigger event is a user alert event.

4. The system of claim 1, wherein the instructions included in the data content extracted from the received media transmission signal cause the room lighting system to reduce the intensity of the room lighting when the video content transitions to a scene taking place at night.

5. The system of claim 1, wherein the hardware processor is further configured to execute the executable code to:

transmit, using the wireless communication element and in response to reaching another trigger event in the video content while displaying the video content on the display, second instructions according to the data content extracted from the received media transmission signal to a user device, the user device being configured to execute another action.

6. The system of claim 5, wherein the second instructions are configured to cause the user device to power down.

7. The system of claim 1, wherein the room lighting system is an in-home lighting system.

8. A method for use with a system including a media device, a display, a room lighting system wirelessly connected to the media device and separate and distinct from the display, the media device including a wireless communication element, a non-transitory memory, and a hardware processor, the method comprising:

receiving a media transmission signal including video content and data content associated with the video content, the data content associated with the video signal and included in the media transmission signal being in a dedicated data stream of the media transmission signal;

extracting the data content associated with the video content from the received media transmission signal;

displaying the video content on the display in accordance with a video content timeline; and transmitting from the media device receiving the media transmission signal to the room lighting system wirelessly connected to the media device, using the wireless communication element, the data content, wherein transmission of the data content occurs in response to reaching a pre-programmed trigger event in the video content timeline while displaying the video content on the display, the room lighting system being configured to provide room lighting and execute an action;

wherein the instructions included in the data content cause the room lighting system to execute the action to change an intensity of the room lighting provided by the room lighting system.

9. The method of claim 8, wherein the data content included in the media transmission signal is synchronized with the video content included in the media transmission signal.

10. The method of claim 8, wherein the trigger event is a user alert event.

11. The method of claim 8, wherein the instructions included in the data content extracted from the received media transmission signal causes the room lighting system to reduce the intensity of the room lighting when the video content transitions to a scene taking place at night.

12. The method of claim 8, further comprising:

transmitting, using the wireless communication element and in response to reaching another trigger event in the video content while displaying the video content on the display, second instructions according to the data content extracted from the media transmission signal to a user device, the user device being configured to execute another action.

13. The method of claim 12, wherein the second instructions are configured to cause the user device to power down.

14. The method of claim 8, wherein the room lighting system is an in-home lighting system.

* * * * *